Dec. 23, 1941.   W. S. LANDON   2,266,975
CONTROL DEVICE
Filed Feb. 16, 1939   2 Sheets-Sheet 1

INVENTOR
Walter S. Landon
BY Andrew K. Foulds
his ATTORNEY

Dec. 23, 1941.   W. S. LANDON   2,266,975
CONTROL DEVICE
Filed Feb. 16, 1939   2 Sheets-Sheet 2

INVENTOR
Walter S. Landon
BY
Andrew K. Foulds
his ATTORNEY

Patented Dec. 23, 1941

2,266,975

UNITED STATES PATENT OFFICE 2,266,975

CONTROL DEVICE

Walter S. Landon, Detroit, Mich., assignor to Detroit Lubricator Company, Detroit, Mich., a corporation of Michigan Application February 16, 1939, Serial No. 256,762

10 Claims. (Cl. 236—68)

My invention relates to new and useful improvements in heat operated power means and more particularly to such a means which is energized automatically or at the will of an operator, and is particularly adapted among other uses for actuating a valve to control the supply of fuel to a burner.

An object of my invention is to provide a thermostatic operated means.

Another object is to provide a thermostatically operated means operable by an automatic means or at the will of an operator.

Another object is to provide means for maintaining a lag of operating time between energization of the means and operation thereof.

Another object is to provide means for maintaining this lag of operation constant over a range of ambient temperature.

Another object is to provide means for regulating this lag of operation for use on any particular application.

Another object is to provide a liquid fuel flow controlling valve which will control the flow of liquid fuel in response to an automatically operable means, and maintain constant the lag between operation of the operable means and flow through the valve means.

Another object is to provide a combined means for controlling the flow of fluid fuel and for controlling an igniting means to ignite the controlled fuel.

Another object is to provide means which will perform a given operation upon being energized, and upon either deenergization or upon predetermined continued energization stop the given operation.

These and other objects will be apparent from the following detailed description.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated a preferred embodiment of my invention, in which drawings—

Fig. 5 is a view of a portion of the apparatus of Fig. 1 showing a modification of my invention;

Fig. 10 is a detail view of a portion of the apparatus of Fig. 7 looking in the direction of the arrows and taken along the line 10—10 of Fig. 7.

Figures 1, 6, 9:
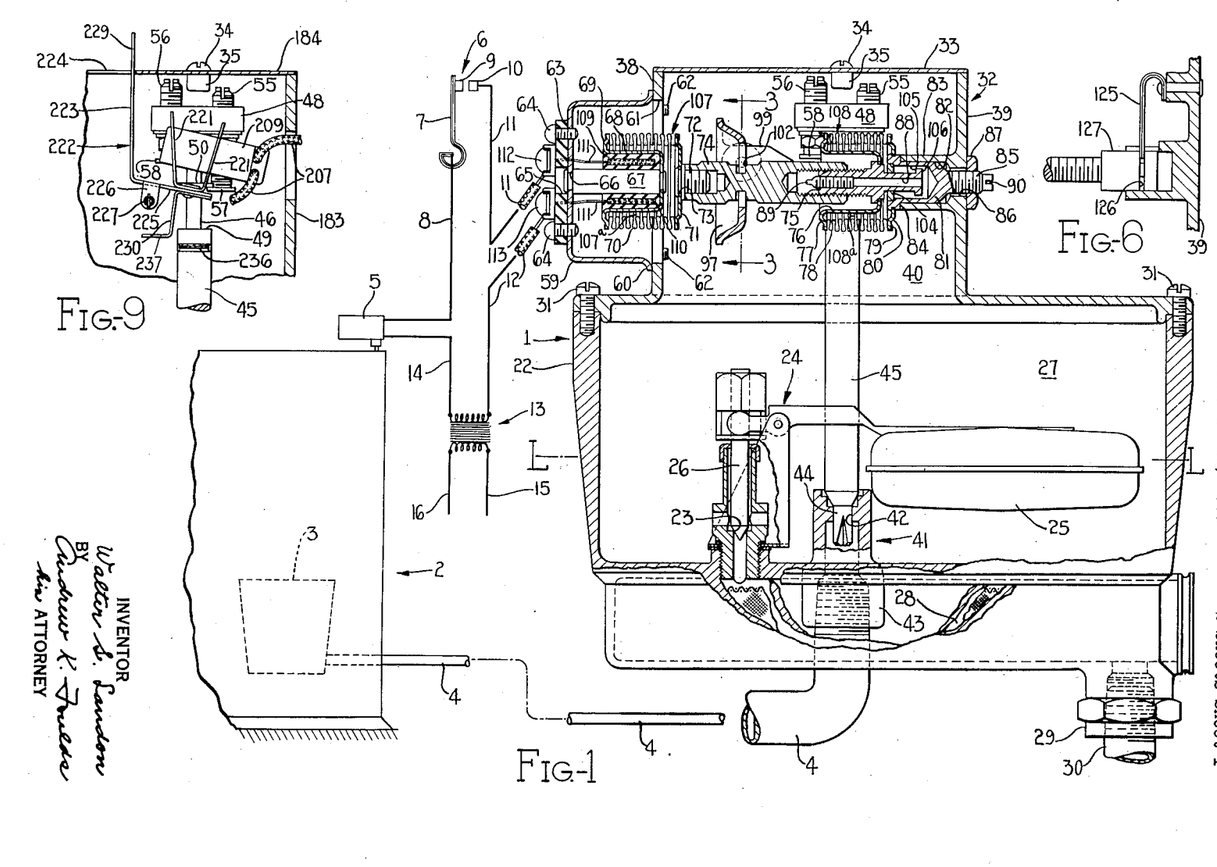
Figure 1 is a view of a portion of an oil burning system including a liquid fuel flow controlling device embodying my invention and shown in partial central vertical section.
Fig. 6 is a view of a portion of the apparatus of Fig. 1 showing a still further modification of my invention.
Fig. 9 is a view of a portion of the apparatus of Fig. 7 looking in the direction of the arrows and taken along the line 9—9 of Fig. 8.

Referring to the drawings by characters of reference the numeral 1 designates generally a flow controlling device connected in an oil burning system including a heating means 2 having a fuel burner 3 which is supplied with liquid fuel from the flow controlling device 1 through a conduit 4. A safety or control switch 5 is carried by and is sensitive to a temperature condition of the heating means 2 so that upon a predetermined abnormal condition thereof the switch 5 is moved to open position. A room thermostat 6 comprises a temperature sensitive, bimetallic element 7 which is connected by a lead wire 8 to the switch 5 and carries a contact member 9 which cooperates with a fixed contact member 10 to control an electrical circuit. The thermostat 6 is located in a space which is heated by the heating means 2 and acts upon a predetermined low temperature to make circuit therethrough and acts upon a predetermined higher temperature to break the circuit therethrough. Lead wires 11, 12, connected to the control device 1 in a manner to be hereinafter described, connect respectively the device 1 to contact member 10 and one side of the secondary coil of the transformer 13. The other side of the secondary coil of transformer 13 is connected by lead wire 14 to the switch 5 to complete the electrical circuit. The primary of the transformer 13 is connected by lead wires 15, 16 to a source of electrical energy supply.

The control device 1 comprises a chambered member 22 including an inlet orifice 23 controlled by a float operated, constant level inlet means 24 having a float 25 operating an inlet controlling valve 26 which is operable to maintain a constant level of liquid within a chamber 27, which level is designated by the line L—L. The chamber 27 is supplied with liquid through the orifice 23, a strainer chamber 28 and an inlet means 29. The inlet means 29 is supplied by an inlet conduit 30 leading from a source of supply (not shown). Secured by means of screws 31 to and closing the top or open side of the chambered member 22 there is a second chambered member 32 having its open top or upper end closed by a cover 33 secured to the member 32 by screws 34 (one of which is shown) which are screwthreaded into bosses 35. The bosses 35 project from and are part of the side walls 36, 37 of the member 32. The other side walls of the member 32 are designated by the numerals 38, 39 and cooperate with walls 36, 37 to form a chamber 40 open at each end, with one end opening downwardly into chamber 27 and the other end closed by the cover 33. A vertically extending, tubular outlet member 41 has an orifice or outlet port 42 therein, the member 41 projecting from the chamber 27 through the bottom wall of member 22 to the exterior thereof, as at 43, for threaded connection to an outlet conduit 4. A metering needle valve or pin 44 controls flow through the orifice 42 and has a stem portion 45 extending upward through the chamber 27 into the chamber 40 terminating in a portion of reduced diameter, as at 46. The portion 46 is guided within an aperture 47 located in a boss 48 which projects inwardly into the chamber 40 from and forms part of the side wall 37. The aperture 47, located in a vertical line above the outlet orifice 43, forms a guide for and is located in such a manner that the metering valve 44 is freely held for reciprocal movement.

Figure 2:
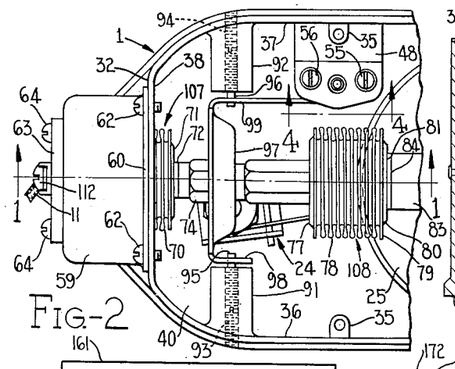
Fig. 2 is a top plan view, with cover removed, of part of the apparatus of Fig. 1.

The reduced diameter portion 46 at its intersection with the normal diameter portion of the stem 45 forms a shoulder 49, and spaced therefrom on the reduced diameter portion 46 but below the boss 48 is an annular ring 50 of enlarged diameter, secured to the portion 46. The under and upper faces of the ring 50 form shoulders 51, 52 for a use to be hereinafter described. Screwthreaded into threaded apertures 53, 54 which are parallel to but spaced from aperture 47 and extending through the boss 48 are two stop members 55, 56 having abutment plates 57, 58 respectively which cooperate with the shoulders 51, 52 respectively to limit vertical movement of the valve 44 in its reciprocatory movement. A cup-shaped member 59 having a rectangular flange portion 60 and overlying an aperture 61 in the wall 38 of chamber 40 is secured to the wall 38 by means of screws 62 inserted through apertures in the corner portions of the flange 60. A terminal member 63, secured to the bottom portion of the member 59 on the side away from the chamber 40 by means of screws 64, has an aperture 65 extending therethrough and aligned with an aperture 66 through the bottom of the member 59.

One end of a supporting pin 67 is secured within the aperture 66, as by peening, and the other end is secured within a cup-shaped member 68. The lip of the cup-shaped member 68 faces the bottom of member 59 and is enlarged to form an outwardly facing annular flange 69. One end of a bellows 70 is secured in fluid-tight relation to the flange 69 and the other end extends, as shown, toward and into the chamber 40 where it is secured and sealed to an annular end plate 71. An attaching screw 72 is secured and sealed within a central aperture 73 through the plate 71. Screwthreaded to the attaching screw 72 is one end of a horizontal, movable connecting member 74 having its opposite end screwthreaded to an attaching screw 75. The screw 75 is secured in fluid-tight relation within an aperture through the bottom wall of a cup-shaped member 76. The member 76 has an annular ring 77 extending circumferentially from its lip edge portion which projects toward the bellows 70. A bellows 78 is sealed at one end to the ring 77 and sealed at the other end, as at 79, to the peripheral edge of an annular plate 80 secured to a thimble member 81. The thimble member 81 is carried within an aperture 82 extending through an inwardly projecting boss 83 of the wall 39, and a shoulder 84 on the member 81 abuts the inner end wall of the boss 83. A threaded portion 85 of the member 81 projects loosely through a reduced portion 86 of the aperture 82 and extends externally beyond the wall 39. The extended portion 85 has a holding nut 87 screwthreaded thereon which serves to hold the thimble member 81 securely to the shoulder 84 by engagement of the nut 87 with the wall 39. The attaching screw 75 has a central aperture 88 therethrough which communicates with the chamber formed within the bellows 78 and, after charging of the bellows, is sealed externally thereof in a convenient manner, as at 89. A screw driver slot 90 serves as a means for rotating the screw 75 thereby to exert more or less of the inherent resiliency of the bellows 78 tending to oppose movement of the bellows 70.

A pair of inwardly projecting bosses 91, 92 having threaded apertures 93, 94 therethrough project into the chamber 40 from and are integral with the walls 36, 37. Threaded into the apertures 93, 94 are pin fulcrum members 95, 96 upon which are fulcrumed a lever member 97 connecting the valve 44 to the power element bellows 70. The member 97 is dished and has two arms 98, 99 which in this instance are of unequal lengths and have aligned apertures therethrough to receive the fulcrum members 95, 96. A pair of ears 100 are displaced from the centerline of the fulcrum members 95, 96 and extend into a central aperture 101 of the dished portion of member 97 so that movement of the ears 100 by the member 74 will cause the member 97 to rotate about the fulcrum members 95, 96. The ears 100 are received in a peripheral cut 102 in the connecting member 74, which cut 102 is of sufficient width to permit some twisting movement of the ears 100 so that movement caused by the rotation of the lever member 97 about the pins 95, 96 will not cause the ears 100 to bind. The arm 99 extends beyond the fulcrum member 96 and terminates in a circular engaging portion 103 fitting between the shoulders 49, 51 and by engagement with the shoulders is operable to reciprocate the valve 44 and thereby to control the flow through orifice 42.

A ring 104 is press-fitted into the open end of an aperture 105 within the thimble member 81, and an extension on the attaching screw 75 carries an abutting portion 106, which portion 106 cooperates with the ring 104 to limit expansion of the bellows 78. The plate 71, bellows 70 and cup-shaped member 68 cooperate to form a sealed, pressure responsive chambered member 107 having a chamber 107ª. The cup-shaped member 76, bellows 78 and annular plate 80 cooperate to form a second sealed, pressure responsive chambered member 108 having a chamber 108ª. These chambers 107ª, 108ª are evacuated and the chamber 107ª is charged with a volatile, temperature responsive fluid such as ethyl ether. Preferably the chamber 108ª formed within the bellows 78 is charged with a fluid having a higher vapor pressure at a given temperature than that of the fluid in chamber 107ª, and which fluid may be ethyl chloride. The fluid charge in both chambers may be of such quantity that at all operating temperatures a small quantity thereof is in the liquid state, but at no time should the quantity of liquid be sufficient to exert a hydraulic force within the chambers. The bellows 70, 78 may be of equal cross-sectional area so that the difference in the forces exerted by the contained fluids is dependent upon the pressure within the chambered members 107, 108.

Sealed by an electrical insulating cement 109, within the cup-shaped member 68 and surrounding the supporting pin 67, there is a cylindrical shaped, electrical resistance heating unit 110 having lead wires 111 leading to external terminals 112, 113 on the terminal member 63 and insulated thereby from each other and from the member 59. The terminals 112, 113 receive the lead wires 11 and 12 respectively so that the heater is under the control of the thermostat 6, and upon closing of the thermostat 6 an electrical circuit is made from the transformer 13, lead wire 14, switch 5, lead wire 8, bimetallic element 7, contact members 9, 10, lead wire 11, heating unit 110 and lead wire 12 back to the transformer 13. Should the heating means 2 be abnormally heated, the switch 5 will be in open circuit position and the heating unit 110 will remain deenergized regardless of the action of the thermostat 6. The heating unit 110 is in heat exchange relation with the fluid within the chamber 107ª and is of such size that it will raise the temperature of the fluid, and thereby the pressure within the chambered member 107, to a pressure substantially greater than that within the chambered member 108 so that the member 107 will expand to urge the valve 44 toward open position. The expansion of member 107 will collapse the member 108 an equal amount.

In Fig. 5 where like numerals designate like parts, the chambered member 108 is replaced by a bimetallic strip 120 secured to the wall 39 by a rivet 121. An adjustment member 122 screwthreaded to the connecting member 74 is slidably received in the aperture 82 within boss 56 and serves as an adjustment means to regulate the relative effects of the bimetallic strip 120 and the chambered member 107. A portion 123 of member 122 is received by the aperture portion 86 through the wall 39 and extends through the wall to abut and engage the bimetallic strip 120 which is sensitive to ambient temperature and operable to oppose movement of the member 74 due to increased temperature of the chambered member 107.

In Fig. 6 the bimetallic strip 125 is located within the chamber 40 and is received within a groove 126 within a member 127 instead of being located as is the bimetallic strip 120 of Fig. 5. In other respects however the modification shown therein is similar to that of Fig. 5.

Figures 3, 4, 7:
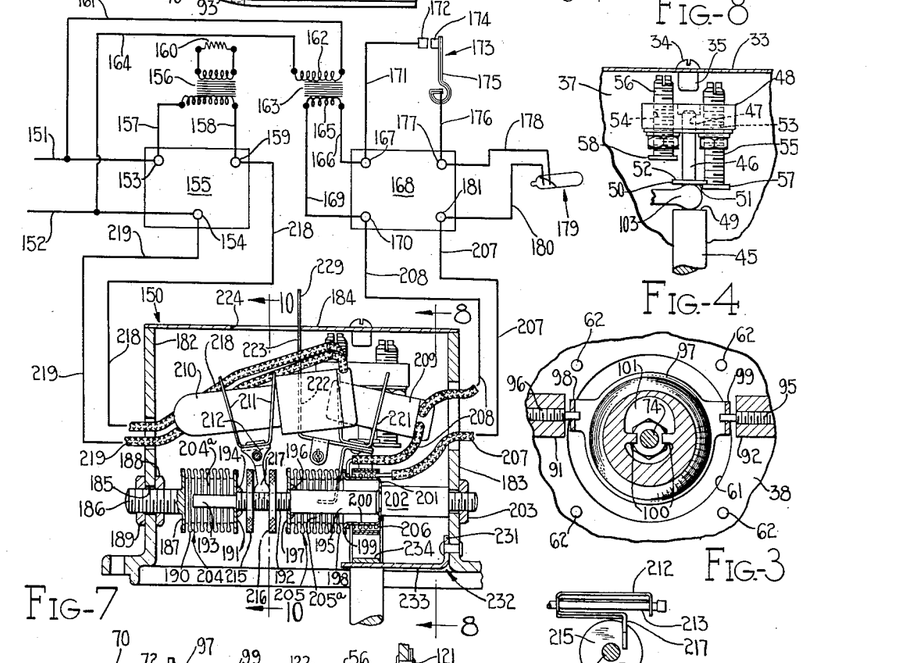
Fig. 3 is a detail view looking in the direction of the arrows and taken along the line 3—3 of Fig. 1.
Fig. 4 is a detail view in section looking in the direction of the arrows and taken along the line 4—4 of Fig. 2.
Fig. 7 is a diagrammatic view of a modified oil burning system showing in central vertical section a portion of a liquid fuel flow controlling device embodying a modified form of my invention.
Figure 8:
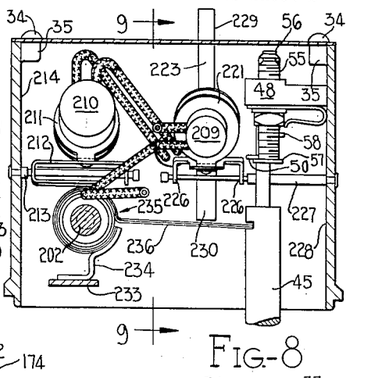
Fig. 8 is a detail view looking in the direction of the arrows and taken along the line 8—8 of Fig. 7.

In Fig. 7 I have shown a different application of my invention. A chambered member 150 is similar to and adapted to be substituted for the chambered member 32 of Fig. 1 on the chambered member 22. Electrical energy from a source of supply is introduced through main lead wires 151 and 152 connected to terminal posts 153, 154 respectively of a terminal block 155. An ignition transformer 156 has one end of its primary coil connected by a lead wire 157 to the main lead wire 151 through terminal post 153, and the other end of the primary coil connected by means of a lead wire 158 to a terminal post 159 carried by the terminal block 155. The secondary coil of the ignition transformer 156 is connected to an igniter for igniting the fuel oil at the burner, and diagrammatically shown in the drawings as a resistance 160. A lead wire 161 is connected to main line 151 and leads to the primary coil 162 of a transformer 163, the other side of the primary coil 162 being connected by means of a lead wire 164 to the main lead wire 152. The secondary coil 165 of the transformer 163 has one end thereof connected by means of a lead wire 166 to a terminal 167 secured to a second terminal block 168. The other end of the secondary coil 165 is connected by means of a lead wire 169 to a contact post 170 also carried by the terminal block 168. One end of a lead wire 171 is connected to the terminal post 167 and the other end is connected to the stationary contact 172 of a room thermostat, diagrammatically shown and designated 173. A movable contact member 174 is carried by a bimetallic temperature sensitive element 175 of the room thermostat 173 and is electrically connected through the element 175 and a lead wire 176 to a terminal post 177 also secured to the terminal block 168. A lead wire 178 connects the terminal post 177 to one contact of a switch, diagrammatically shown at 179, which switch is preferably sensitive to an output of the heating means so that upon an abnormal condition thereof the switch 179 is moved to open position. The other contact of the temperature sensitive switch 179 is connected by means of lead wire 180 to a terminal post 181 secured to the terminal block 168.

The chambered member 150 has end walls 182, 183 and a cover member 184. Secured within an aperture 185 in the end wall 182 is one end of a bolt-like member 186 having at its other end, which other end is located within the chambered member 150, a plate-like head portion 187. A pair of nuts 188, 189 are threaded onto the bolt member 186 so that the nut 188 is within the casing and the nut 189 is without the casing. The member 186 is rigidly secured to the end wall 182 by the nuts 188, 189 which clamp the member 186 tightly to the wall 182. The nuts 188, 189 are also used as an adjustment means to be hereinafter described. Sealed to the plate-like portion 187 is one end of a bellows member 190. The other end of the bellows member 190 extends toward the end wall 183 and is sealed in fluid-tight relation to a disc or head member 191. A heat conducting thrust member 192 has one end 193 extending centrally through the disc member 191 within the bellows member 190 and sealed in fluid-tight relation to the member 191 by means, such as solder 194. The other end 195 of the thrust member 192 is secured, by means such as solder 196, centrally within a disc member 197. Secured in fluid-tight relation to the disc member 197 is one end of a bellows member 198. The other end of the bellows member 198 extends toward the end wall 183 and is secured in fluid-tight relation to an outturned flange 199 of a cup member 200. The bottom end wall 201 of the cup member 200 is secured to and carried in a suitable manner by an abutment member 202 held, as by a clamping nut 203, to the end wall 183. The bellows member 190 cooperates with the members 187, 191 to form a temperature sensitive, expansible-contractible, chambered member 204 having a chamber 204a, while the bellows member 198 cooperates with the members 197, 200 to form a second expansible-contractible, temperature sensitive chambered member 205 having a chamber 205a. The end portions of the thrust member 192 engage the end wall 201 and the head portion 187 of the bolt-like member 186 to limit the reciprocal movement of the thrust member 192 under influence of the pressure responsive chambered members 204, 205.

Surrounding the cup member 200 and intermediate the flange portion 199 and the end wall 201 is a suitable electric heater 206 having one end thereof connected by means of a lead wire 207 to the terminal post 181. The other lead wire 208 of the heater coil 206 is connected through an electric switch means 209, which may be a mercury tube type switch, the operation of which will be described in detail hereinafter, to contact post 170. The chambers 204a, 205a contain volatile, temperature sensitive fluids, in accordance with the teachings of Fig. 1. The fluid within chamber 204a will preferably have a higher fluid pressure at a given temperature than the fluid pressure of the volatile fluid contained within the chamber 205a. When no heat is supplied to the volatile fluids in chambers 204a, 205a, and the fluids are at ambient temperature, the pressure within the chambered member 204 will exceed that within the chambered member 205 and the thrust member 192 will be urged in a direction toward and against the end wall 183 similarly to that described in connection with Fig. 1. The temperature sensitive fluids used in chambers 204a, 205a, in the construction of Fig. 7, are furthermore so proportioned relative to each other and to the heat output of the heater 206 and the thermal conductivity of the member 192, that shortly after energization of the heater 206 the fluid pressure in the chamber 205a will exceed that within the chamber 204a due to the heating effect of heater 206. This will cause the thrust member 192 to be urged in a direction toward the end wall 182. Upon continued heating of the heater 206 the heater will assume a predetermined maximum temperature and heat will be conducted from the heater 206 through the volatile fluid in the chamber 205a and the heat conducting thrust member 192 to the volatile fluid contained within the chamber 204a, and after a predetermined time the temperature of the fluid within the chamber 204a will have risen sufficiently so that the pressure therein will exceed the maintained pressure within the chamber 205a and the thrust member 192 will be urged toward the end wall 183. It is seen that I have a heat operated device which upon energization moves in one direction and after a predetermined time moves in the reverse direction.

A switch means 210 which may be a mercury tube type switch is carried by a U-shaped member 211 secured to a pivoted member 212 pivotally secured to a rod-like pivot 213 carried by a side wall 214 of the chambered member 150. The portion of the thrust rod 192 intermediate the plate members 191, 197 is suitably threaded, and threaded thereon is a pair of adjustment nuts 215, 216. The pivoted member 212 has a projecting portion 217 which projects downward and is received intermediate the members 215, 216 so that reciprocal movement of the thrust member 192 will rock the switch means 210 into circuit making and circuit breaking positions. The switch means 210 has one lead wire 218 connected to the contact post 159 and the other lead wire 219 connected to the terminal post 154. The switch means 209 is carried by a U-shaped member 221 in a similar manner as the switch means 210 is carried by the member 211. A bell crank member 222 has one arm 223 extending upward through an aperture 224 in the cover 184 of the chambered member 150. The other arm 225 of the bell crank member 222 has a pair of downwardly turned ears 226. A rod-like pivot member 227 is carried by a side wall 228 of the chambered member 150 and extends through a pair of aligned apertures in the ears 226 so that the bell crank member 222 may be rotated about the member 227. An end portion 229 of the bell crank arm 223 extends externally of the cover member 184 and serves as a manual means for rotating the bell crank member 222 to cause the switch means 209 to make and break the circuit through the lead wire 207.

The U-shaped member 221 is secured to the upwardly facing surface of the arm 225. Secured to the under surface of the arm 225 is one arm of an S-shaped member 230, the purpose of which will be described hereinafter. Secured to the end wall 183 of the casing 150 is one end 231 of an L-shaped member 232 having a horizontally extending portion 233 projecting toward the end wall 182 and underlying the cup-shaped member 201. A supporting member 234 is secured to the horizontal portion 233 and carries a bimetallic temperature sensitive element 235 which surrounds the heater 206 and is sensitive to the heat output thereof. Upon energization of the heater 206 the bimetallic element 235 through its horizontally extending arm 236 tends to raise the valve 44 until the annular ring 50 thereof engages the upper abutment plate 58 of the stop member 56 to open the outlet port 42 to flow of liquid fuel. Continued heating of the heater 206 acts through the bimetallic member 235 to maintain the valve 44 in open position as long as the heater 206 remains energized. The lower arm 237 of the S-shaped member 230 cooperates upon rotation of the bell crank member 222 with the portion 236 of the thermostatic member 235 to force the portion 236 downward, thereby to close the valve member 44 and open the circuit through the switch means 209, and which is described more fully hereinafter.

The operation of my flow controlling device or heat motor, as shown in Fig. 1, is as follows: When the thermostat 6 is not in circuit closed position (calling for heat), the heater unit 110 will be deenergized and both chambered members 107, 108 will tend to assume ambient temperature, which for purposes of exposition we shall assume to be 30° F. Upon reaching ambient temperature the fluid pressure of the ethyl ether within member 107 will be approximately 3.3 pounds per square inch absolute, while the fluid pressure of the ethyl chloride in member 108 will be approximately 8.5 pounds per square inch absolute. If we now assume that the effective areas of the bellows 70 and 78 is one square inch respectively, then a net force of 5.2 pounds is urging the connecting member 74 toward valve closed position. If the thermostat 6 now moves to circuit closed position, the heating unit 110 will be energized and the pressure of the fluid within chamber 107 will increase due to the increase in temperature thereof by the unit 110. It may be seen from a table of the pressure-temperature relationships for ethyl chloride and ethyl ether that at a temperature of approximately 69° F. the pressure of the ethyl ether will be 8.5 pounds per square inch, or that with the temperature of the ethyl chloride at ambient, or 30° F., and the temperature of the ethyl ether at 69° F., the opposing forces exerted by the members 107, 108 will be equal so that upon any further increase in temperature of the ethyl ether within chamber 107ᵃ the pressure in chamber 107ᵃ will tend to expand the bellows 70 to move the valve member 44 toward open position. The bellows 78 of chambered member 108 will collapse somewhat, but as the pressure exerted by the ethyl chloride within chamber 108ᵃ is substantially vapor pressure corresponding to the liquid temperature, any collapsing movement will not cause a substantial increase in pressure but will merely cause some of the vapor therein to condense into a liquid state. This is true in instances where the change in volume per unit of time is a small percentage of the whole volume, and the heat given up by the condensing vapor is small in respect to the heat absorbing matter in intimate relationship therewith. It has now been shown that to move the valve to open position it is necessary to raise the temperature of the ethyl ether to slightly more than 39° F. above an ambient temperature of 30° F., and that with both liquids at the ambient temperature of 30° F. the connecting member 74 is urged in a closed direction with a force of 5.2 pounds per effective square inch of the bellows cross-sectional area.

Suppose that the ambient temperature of 80° F. existed, then the pressure of ethyl ether would be 10.8 pounds per square inch absolute and the ethyl chloride would be at 24.2 pounds per square inch absolute. The connecting member 74 will be urged toward valve closing position with a force of 13.4 pounds, assuming as before one square inch of effective cross-sectional area of the bellows. To equalize the pressure of the two bellows chambers it is necessary to raise the temperature of the ethyl ether to 120.5° F., or an increase of 40.5° F. above the ambient temperature of 80° F., at which time a further increase of temperature of the ethyl ether will cause a valve opening force as described in connection with the 30° F. ambient operation. It will be noticed that the rise in temperature of the ethyl ether necessary to overcome the force of the ethyl chloride has remained substantially constant even though the differential force at the two ambient temperatures was decidedly different. It may further be seen that as the ambient temperature increases, the fluid pressure within the bellows chamber corresponding to ambient temperature increases. If no means were provided to exert an increasing opposing force with increasing ambient temperature, such as the pressure chamber containing ethyl chloride, the increase in fluid pressure or temperature rise above ambient needed to open the valve would be decreased due to the increased pressure at ambient temperature. The heater element supplies heat to the liquid containing chamber at a substantially constant rate and therefore the average rate of temperature increase of the fluid will be substantially constant for the same degree of temperature rise at any and all ambient temperatures. Thus if the temperature rise above ambient was allowed to vary with ambient temperature, the time period between the energization of the heater and the actuation of the actuator, or valve, would vary inversely as the ambient temperature, which is undesirable in many applications. With my apparatus however the rise in temperature above ambient is maintained substantially constant, and as my heater is maintained at a constant output and the mass to surface ratio balance is maintained constant, the time elapsing between energization of the heater and operation of the heat motor is constant.

I have designed my heater to run continuously as long as it is desired for the heat motor to operate, and furthermore it is designed to maintain a predetermined constant differential between ambient temperature and the fluid temperature within the actuated bellows. In my particular application I have found that 140° F. is satisfactory for the temperature rise caused by continuous operation. At 30° F. ambient temperature this would mean a maximum fluid temperature of 170° F. while at an ambient temperature of 80° F. it would mean a maximum fluid temperature of 220° F. As the maximum temperature rise caused by continuous operation of the heater is constant, and the temperature rise above ambient to operate the valve is substantially constant, the difference between the two, or the temperature drop required to move the valve from open to closed position, is constant.

The relative times between opening of the valve upon energization of the heat motor and closing of the valve upon deenergization of the heat motor may be adjusted or varied at will by loosening the nut 87 and rotating the thimble member 81 by a suitable instrument, such as a screw driver in the slot 90. The rotation is transferred through the bellows 78 and cup-shaped member 76 to the screw 75 which moves longitudinally in the member 74 to vary the innate resiliency of the bellows 78. If greater adjustment is desired, a spring or springs could be interposed in a convenient manner to augment the innate resiliency of the bellows.

In the apparatus shown, I apply an electrical voltage to the terminals 112, 113 of the electrical heating unit 110 by means of the transformer 13 and the thermostat 6, as described hereinbefore, and heat starts to flow to the fluid in the chamber 107ᵃ. After a predetermined time the fluid pressure in the chamber 107ᵃ will equal and then become greater than that in the chamber 108ᵃ and will expand the chambered member 107 to move the connecting member 74. The ears 100 of lever member 97 will be engaged by the walls of the slot 102 and the lever member 97 will be rotated thereby about the fulcrum members 95, 96. The rotation of the lever member 97 will raise the valve 44 until the shoulder 52 engages and is stopped by the plate 58. Further increase in fluid pressure within the chamber 107ᵃ will cause a tighter engagement between the shoulder 52 and plate 58, but substantially no further movement either of the connecting member 74 or lever member 97.

After a given elapsed time, the fluid in chamber 107ᵃ will have attained the maximum temperature, or 140° F., above ambient temperature. Upon deenergization of the heater 110 the fluid starts to cool to ambient temperature. The temperature of the fluid in chamber 107ᵃ decreases and the pressure likewise decreases until at the substantially constant temperature rise of 40° F. above ambient temperature, or 100° F. below the maximum temperature rise, the valve begins to close. As the mass to surface ratio and the radiating temperature differentials are constant for all ambient temperature, substantially constant time will be required for closing as well as opening upon deenergization or energization respectively of the heater unit 110.

In the modification shown in Figs. 5 and 6, I have bimetallic strips 120 and 125 which respond to increasing ambient temperature, the strip 120 being without and the strip 125 being within the chamber 40. The strips 120, 125 act with increasing force to urge the valve in a closing direction with increasing temperature. These bimetallic strips 120, 125 if correctly proportioned and shaped will perform as effectively as the chamber 108. Adjustment in this modification is accomplished by means of the adjustment member 122 screwthreaded to the member 74 (not shown in Fig. 6).

The operation of the device as illustrated in Fig. 7 is similar to that of Fig. 1 but, because of the thermal conductivity of the thrust member 192, differs therefrom and operates as follows: Electrical energy supplied from a suitable source through lead wires 151, 152 energizes the transformer 163. The output of the transformer is controlled by the thermostat 173 located in the space which is heated by the burner. Upon decrease in temperature of the space heated by the burner, the bimetallic element 175 moves the contact member 174 into engagement with the stationary contact member 172 thereby completing a circuit from the secondary coil 165 of the transformer 163, lead wires 166, 171, thermostat 173, lead wires 176, 178, switch 179, lead wires 180, 207, heater 206, lead wire 208, switch means 209, and lead wire 169 to the other side of the secondary coil 165. Under normal operation of the system the switch means 179, 209 will remain in circuit closed position, the switch means 179 acting to open the circuit upon a predetermined abnormal temperature condition of the heating means to prevent injury thereto, and the switch means 209 being manually opened by means of the bell crank member 222 upon an abnormal condition such as failure of the burner to ignite. Upon closing of the circuit by the room thermostat 173, the heater 206 heats the fluid in the chamber 205a increasing the fluid pressure of the volatile fluid contained therein to force the thrust member 192 toward the end wall 182. Movement of the thrust rod 192 toward the end wall 182 acts through the member 212 to rotate the switch means 210 into switch closed position, thereby closing a circuit leading from the main lead wire 152, lead wire 219, through switch means 210, lead wires 218, 158, the primary coil of the transformer 156, and lead wire 157 back to the main lead wire 151. As the secondary of the transformer 156 is continually connected to the igniter 160, closing of the switch means 210 energizes the igniter. After a predetermined time interval the temperature of the fluid within the chambered member 204 is raised sufficiently so that the fluid pressure within the chambered member 204 becomes greater than the fluid pressure in the chamber 205a, and the thrust member 192 is moved toward the end wall 183 to rotate switch means 210 into open circuit position thereby deenergizing the igniter 160. During the time that the heater 206 has been supplying heat to the members 204, 205 it is also supplying heat to the bimetallic member 235 so that the horizontal portion 236 thereof will have moved the valve member 44 to valve open position. Under normal operation the burner is now energized and is supplying heat to the heated space. Upon the desired temperature being reached within the space, the bimetallic element 175 moves the movable contact member 174 away from the stationary contact member 172 to open the electrical circuit, hereinbefore described, controlling the energization of the heater 206. Upon deenergization of the heater 206 the temperatures of the chambered members 204, 205 and the bimetallic element 236 begin to decrease toward ambient temperature. This decrease causes the bimetallic element 236 to move the valve member 44 toward closed position, thereby stopping flow of fuel to the burner. The chambered members 204, 205 while cooling to ambient temperatures will maintain the thrust member 192 in its position toward the end wall 183 as the fluid pressure in the chamber 204a will always exceed the fluid pressure in the chamber 205a.

If for some reason the fuel fails to ignite in the burner 3, it will be necessary to manually reset the control means because the thermostat 173, under such a condition, will continue to call for heat and the switch means 210 and fuel valve 44 will be in open position and remain in that position until either the manual reset mechanism is moved to open switch 209 or the thermostat 173 is manually moved to open position. Rotation of the end portion 229 of the bell crank member 222 in a counterclockwise direction (as shown in Fig. 7) forces the lower portion of the S-shaped member 230 over the horizontal portion 236 of the bimetallic member 235 so that the metering valve 44 is moved against its lowermost stop member to cut-off flow of fuel to the burner 3. This movement will place the bimetal under tension because of its tendency when heated by the heater 206 to move in a valve opening direction. Movement of the member 222 will also rock the switch means 209 to open the circuit through the room thermostat 173 and heater 206. After the heater 206 has cooled substantially to ambient temperature, the bimetallic member 235 will have assumed its cold or valve closed position and the S-shaped member 230 will be free from and slide from the horizontal portion 236 so that the bell crank member 222 can rotate clockwise to place the switch means 209 in circuit closed position so that if the thermostat is in, or again assumes, circuit closed position, the normal cycle of operation will result. It will be noted that the switch 209 will automatically return to operating position upon cooling of the heater 206, while if the thermostat 173 is used it must be manually reset for subsequent operation. It is to be understood that the manual operation which has just been described is an emergency measure and therefore previous to the resetting operation, care should be exercised to search for and correct the trouble which rendered such operation necessary. One trouble which might cause such operation is the burning-out of the igniter 160 so that upon the thermostat 173 calling for heat and the switch means 210 being moved to closed position, the oil flowing to the burner 3 will not be ignited and consequently the heating means 2 fails to supply heat to the heated space.

The apparatus shown in Fig. 7 may be regulated or adjusted to regulate the time interval for the various operations. The length of time required for the heater 206 to cause the switch 210 to be moved to "on" position and again to "off" position is regulated by means of the nuts 188, 189 which position the bolt-like member 186 rigidly with respect to the casing end wall 182. Movement of the bolt-like member 186 toward the end wall 183 will, by utilizing the inherent resiliency of the bellows members 190, 198, tend to increase the length of time elapsing between the energization of the heater 206 and the movement of the thrust member 192 toward the end wall 182, and will decrease the time required for the reverse movement toward the end wall 183, while the reverse adjustment of the bolt-like member 186 will have the opposite effect. Further adjustment may be had by using spring members (not shown) to add or subtract from the normal resiliency of the bellows members 190, 198, so that a greater change of resiliency or a different ratio of resiliency change might be accomplished by the positioning of the bolt-like member 186. Adjustment of the members 215, 216 will vary the relative proportions of the time the switch 210 is "on" with respect to the time that the switch is "off." To be more specific, if the member 215 is moved toward the head portion 187, the length of time between energization of the heater 206 and the movement of the switch means 210 to "on" position will be increased and the length of time required for the heater to move the switch means 210 to closed position remains unchanged, while movement of the member 216 toward the disc member 197 increases the length of time necessary for the heater 206 to move the switch means 210 to closed position and, with no movement of the member 215, maintain constant the time the switch 210 is moved by the heater 206 to open position.

It will thus be seen that by means of my invention I have a heat motor which is shown on a fluid flow device and which is automatically operable to produce a lag between the operation of the energizing means and operation of the valve. Further, I have an apparatus which may be adjusted for any given desired ratio of operating times between opening and closing by changing the inherent resiliency of the bellows, or by changing the voltage applied to the heater coil the opening and closing may be maintained at any given, absolute lag. An apparatus of this type may be used at various ambient temperatures and yet maintain a substantially constant lag in operation. I have also invented a timing means which when energized will cause a means to be actuated, and upon continued energization of the first-named means the actuated means will be moved to the original or unactuated position according to a predetermined timing schedule. I have further disclosed means for varying the time schedule so that the time periods required to actuate the actuated means and also to move the actuated means to its unactuated position may be adjusted for different conditions of operation.

What I claim and desire to secure by Letters Patent of the United States is:

1. In a controlling device, a casing, a plurality of bellows members, each of said members comprising an hermetically sealed temperature responsive expansible-collapsible chamber, a controlling member, a temperature responsive fluid in one of said chambers, a second temperature responsive fluid having a higher pressure in a second one of said chambers, said temperature responsive fluids being so interrelated that when both of said fluids are at the same temperature and irrespective of the degree of temperature the pressure exerted by said first-named fluid will equal the pressure exerted by said second fluid upon a predetermined substantially constant increase in temperature of said first-named fluid relative to the temperature of said second fluid, heating means operative to increase the fluid pressure in said one chamber, said chambers being operatively connected in opposition and to said controlling member, said controlling member being operable in response to said heating means.

2. A controlling device comprising a supporting member, a controlling means carried by said member, a bellows member hermetically sealed to form an expansible-collapsible chamber, a temperature responsive fluid in said chamber and operable to expand said chamber in response to temperature increases, one end wall of said chamber being secured in fixed spaced relation to said supporting member, a movable connecting member having one end portion securely fastened to the other end wall of said chamber, an electrical resistance heating means having a constant output in heat exchange relation with said fluid in said chamber and operable to cause said fluid to expand said chamber, a second bellows member hermetically sealed to form a second expansible-collapsible chamber, a temperature responsive fluid within said second chamber and having a pressure-temperature curve similar to that of said first-named fluid but having a higher pressure for each corresponding temperature, one end wall of said second chamber being secured to the opposite end of said movable member, the other end wall of said second chamber being secured to said supporting member, said second chamber being responsive to ambient temperature and operable to oppose movement of said first chamber, said movable member being operatively connected to said controlling means, and stop means operable to limit movement which can be imparted to said controlling means by said movable member.

3. A controlling device comprising a casing, a controlling means within said casing, a bellows member hermetically sealed to form an expansible-collapsible chamber, a temperature responsive fluid in said chamber and operable to expand said chamber in response to temperature changes and having a pressure-temperature curve, one end wall of said chamber being secured in fixed spaced relation to said casing, a movable connecting member having one end securely fastened to the other end wall of said chamber, a heating means having a constant output in heat exchange relation with said fluid in said chamber and operable to heat said fluid thereby to cause said fluid to expand said chamber in accordance with said curve, a second bellows member hermetically sealed to form a second expansible-collapsible chamber, a temperature responsive fluid within said second chamber and having a second pressure-temperature curve, said second curve being substantially similar to said first-named curve but displaced therefrom, one end wall of said second chamber being secured to the opposite end of said movable member, the other end wall of said second chamber being secured to said casing, said second chamber being responsive to air temperature within said casing and operable to oppose movement of said first chamber, and means operatively connecting said movable member with said controlling means so that movement of said movable member will move said controlling means.

4. In a control device, a pair of temperature responsive elements acting in opposition against each other, said elements being so constructed and arranged that one of said elements exerts a greater force than the other of said elements when both of said elements are at substantially equal temperatures, a control device movable by said elements, means limiting the movement of the other of said elements by said one element so that said control device will have a predetermined position when said elements are at substantially equal temperatures, means to heat said other element independently of said one element so that said other element will overcome said one element and move said control device, and means to transmit the heat of said heating means from said other element to said one element so that the force exerted by said one element will overcome said other element and move said control device to said device predetermined position.

5. In a control device, a pair of temperature responsive elements acting in opposition against each other, one of said elements having a first predetermined force-temperature curve, the other of said elements having a second force-temperature curve, said curves being similar and spaced from each other, said first curve being spaced above said second curve so that said one element exerts a greater force than said other element when both of said elements are at substantially the same temperature, a control device movable by said elements, means limiting the movement of the other of said elements by said one element so that said control device will have a predetermined position when said elements are at substantially equal temperatures, means to heat said other element independently of said one element so that said other element will overcome said one element and move said control device, and means to transmit the heat of said heating means from said other element to said one element so that the force exerted by said one element will overcome said other element and move said control device to said device predetermined position.

6. In a device of the character described, a supporting means, means mounted for reciprocal movement, a pair of expansible-contractible temperature sensitive chambers having movable walls, one of said chambers having its movable wall connected to and opposing movement of the movable wall of the other of said chambers from said one position of said walls to a second position of said walls, said reciprocal means being moved from one position to a second position upon movement of said other chamber wall, said one chamber containing a temperature sensitive fluid having a predetermined pressure-temperature curve, said other chamber containing a second temperature sensitive fluid having a second predetermined pressure-temperature curve, said second curve being similar to said first-named curve but being displaced therefrom so that for the same fluid temperatures said second fluid has less pressure than said first-named fluid, means for heating said second fluid so that said second fluid pressure will exceed said first-named fluid pressure thereby to cause said other chamber to expand and to move said reciprocal means to said other position, and means operable upon continued heating of said other chamber to raise the temperature of said first-named fluid thereby to increase said first-named fluid pressure above said second fluid pressure thereby to move said walls to said walls one position and said reciprocal means to said means one position.

7. In an automatically operated device, a pair of opposed supporting members, a first bellows member carried by one of said opposed members and having a first movable wall facing the other of said opposed members, a second bellows member carried by said other opposed member and having a second movable wall facing said first movable wall and spaced therefrom, a thrust rod rigidly connecting said movable walls and having a first extending portion extending through said first movable wall and into said first bellows member and having a second extending portion extending through said second movable wall and into said second bellows member, a first temperature sensitive fluid within said first bellows member and in heat exchange relationship with said first extending portion, a second temperature sensitive fluid within said second bellows member and in heat exchange relationship with said second extending portion, said fluids being so interrelated that when both of said fluids are at the same temperature said first fluid exerts a less expansive force on said first bellows member than said second fluid exerts on said second bellows member, means for heating said first fluid thereby to cause said first fluid to exert an increased force on said first movable wall, said increased force causing said first bellows member to expand and said second bellows member to contract, said first extending portion acting to receive heat from said first fluid upon continued heating of said first fluid by said heating means, said rod acting to transmit heat to said second extending portion to heat said second fluid, said second fluid upon heating by said rod acting to increase its force exerted on said second movable wall so that said second bellows member will expand and cause said first bellows member to contract, and means reciprocated by said rod member upon movement by said bellows members.

8. In an automatically operated device, a pair of opposed supporting members, a first bellows member carried by one of said opposed members and having a first movable wall facing the other of said opposed members, a second bellows member carried by said other opposed member and having a second movable wall facing said first movable wall and spaced therefrom, a thrust rod rigidly connecting said movable walls and having a first extending portion extending through said first movable wall and into said first bellows member and having a second extending portion extending through said second movable wall and into said second bellows member, a first temperature sensitive fluid within said first bellows member and in heat exchange relationship with said first extending portion, a second temperature sensitive fluid within said second bellows member and in heat exchange relationship with said second extending portion, said fluids being so interrelated that when both of said fluids are at the same temperature said first fluid exerts a less expansive force on said first bellows member than said second fluid exerts on said second bellows member, means for heating said first fluid thereby to cause said first fluid to exert an increased force on said first movable wall, said increased force causing said first bellows member to expand and said second bellows member to contract, said first extending portion acting to receive heat from said first fluid upon continued heating of said first fluid by said heating means, said rod acting to transmit heat to said second extending portion to heat said second fluid, said second fluid upon heating by said rod acting to increase its force exerted on said second movable wall so that said second bellows member will expand and cause said first bellows member to contract, means reciprocated by said rod member upon movement by said bellows members, means engageable by said first extending portion upon movement of said rod due to expansion of said second bellows member, and means engageable by said second extending portion upon movement of said rod due to expansion of said first bellows member, said first-named and said second-named engageable means acting to absorb any excess force exerted by either of said bellows members.

9. A control device comprising a controlling means, a temperature responsive element operable to move said controlling means, a second responsive element inherently exerting a greater force than said first-named responsive element for all equal temperatures acting on said elements, said second temperature responsive element holding said controlling means against movement by said first-named responsive element, and means to heat said first-named responsive element to a temperature to overcome the greater force of said second responsive element and move said controlling means.

10. A control device comprising a controlling means, a temperature responsive element operable to move said controlling means, a second responsive element inherently exerting a greater force than said first-named responsive element for all equal temperatures acting on said elements, said second temperature responsive element holding said controlling means against movement by said first-named responsive element, means to heat said first-named responsive element to a temperature to overcome the greater force of said second responsive element and move said controlling means, and means operable during the heating of said first-named responsive element to transfer heat from said heating means to said second responsive element to return said controlling means against the force of said first-named responsive element.

WALTER S. LANDON.